(12) United States Patent
Hannig

(10) Patent No.: US 10,190,611 B2
(45) Date of Patent: Jan. 29, 2019

(54) PANEL

(71) Applicant: AKZENTA PANEELE + PROFILE GMBH, Kaisersesch (DE)

(72) Inventor: Hans-Jürgen Hannig, Bergisch Gladbach (DE)

(73) Assignee: AKZENTA PANEELE + PROFILE GMBH, Kaisersesch (DE)

( * ) Notice: Subject to any disclaimer, the term of this patent is extended or adjusted under 35 U.S.C. 154(b) by 0 days.

(21) Appl. No.: 15/610,348

(22) Filed: May 31, 2017

(65) Prior Publication Data

US 2017/0268545 A1 Sep. 21, 2017

Related U.S. Application Data

(63) Continuation of application No. 13/981,984, filed as application No. PCT/EP2012/051139 on Jan. 25, 2012, now Pat. No. 9,695,851.

(30) Foreign Application Priority Data

Jan. 28, 2011 (DE) .......................... 10 2011 009 746
Nov. 22, 2011 (DE) .......................... 10 2011 086 846

(51) Int. Cl.
*F16B 5/00* (2006.01)
*E04F 15/02* (2006.01)
*E04F 15/10* (2006.01)

(52) U.S. Cl.
CPC ...... *F16B 5/0056* (2013.01); *E04F 15/02038* (2013.01); *E04F 15/102* (2013.01);
(Continued)

(58) Field of Classification Search
CPC ........ E04F 2201/0107; E04F 2201/023; E04F 2201/0153; E04F 2201/0123;
(Continued)

(56) References Cited

U.S. PATENT DOCUMENTS 5,797,237 A * 8/1998 Finkell, Jr. .............. E04F 15/04
52/586.1
6,209,278 B1 * 4/2001 Tychsen .................. E04F 15/04
52/592.1
(Continued)

FOREIGN PATENT DOCUMENTS

WO WO-2004048716 A1 * 6/2004 ............. E04F 15/02
WO WO 2010082171 A2 * 7/2010

*Primary Examiner* — Babajide A Demuren
(74) *Attorney, Agent, or Firm* — Lucas & Mercanti, LLP; Klaus P. Stoffel

(57) ABSTRACT

A panel including an upper side, an underside, a basic body, complementary locking elements, which are provided in pairs on mutually opposite panel edges, and at least one pair of locking elements having a receiving hook and an arresting hook. The receiving hook has a hook periphery and a receiving recess. The arresting hook has an arresting recess, an arresting shoulder, a transverse-joint surface and a vertically acting arresting contour. The receiving hook also has a transverse-joint surface and a form-fitting contour. The arresting hook also has a horizontal locking surface on its arresting shoulder. The receiving hook also has a horizontal locking surface in the receiving recess and contains a receiving opening.

3 Claims, 6 Drawing Sheets

Figure 1:
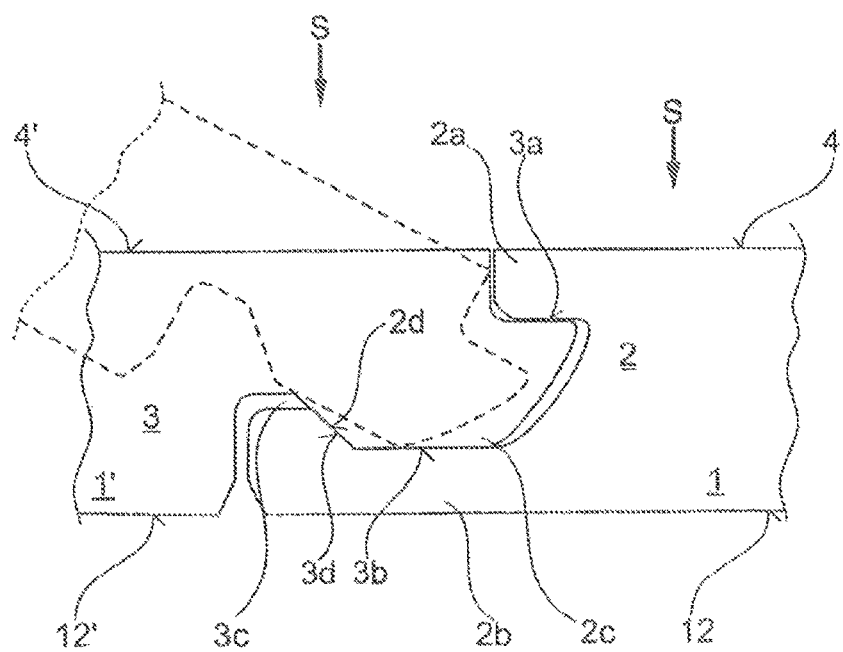

(52) U.S. Cl.
CPC ............ *E04F 15/105* (2013.01); *F16B 5/008* (2013.01); *E04F 2201/0146* (2013.01); *E04F 2201/0153* (2013.01); *E04F 2201/0176* (2013.01); *E04F 2201/03* (2013.01); *Y10T 29/49826* (2015.01); *Y10T 428/24017* (2015.01)

(58) Field of Classification Search
CPC . E04F 2201/0115; E04F 15/02; E04F 15/102; E04F 15/105; E04F 15/02038; E04F 2201/03; E04F 2201/0146; E04F 2201/0176; Y10T 428/24017; Y10T 29/49826; F16B 5/0056; F16B 5/008
See application file for complete search history.

(56) References Cited

U.S. PATENT DOCUMENTS

| | | | |
|---|---|---|---|
| 2007/0011981 A1* | 1/2007 | Eisermann | B27F 1/04 52/588.1 |
| 2009/0193748 A1* | 8/2009 | Boo | B27F 1/02 52/589.1 |
| 2016/0108624 A1* | 4/2016 | Nilsson | E04F 15/10 52/747.1 |

* cited by examiner

PANEL

CROSS-REFERENCE TO RELATED APPLICATIONS

The present application is a Continuation of U.S. patent application Ser. No. 13/981,984, filed Jul. 26, 2013, which is a 371 of PCT/EP2012/051139 filed Jan. 25, 2012, which in turn claims the priority of DE 10 2011 009 746.5 filed Jan. 28, 2011, and DE 10 2011 086 846.1 filed Nov. 22, 2011 the priority of these applications is hereby claimed and these applications are incorporated by reference herein.

The invention concerns a panel including a top side, an underside, a body, complementary locking means provided in pairs at mutually opposite panel edges, at least one pair of locking means with hook profiles, namely a receiving hook and in opposite relationship thereto an arresting hook, with the proviso that the receiving hook has arranged remote from the body a hook edge and arranged nearer to the body a receiving recess, wherein the receiving recess is open towards the top side, the arresting hook is provided with an arresting recess arranged nearer to the body and open to the underside and has an arresting step arranged remote from the body and which fits in a vertical joining direction into the receiving recess of the receiving hook, the arresting hook has a transverse joining surface remote from the body and also remote from the body a vertically acting arresting contour, the receiving hook has nearer to the body a transverse joining surface and also nearer to the body a positively locking contour which fits together in positively locking relationship with the arresting contour, that is remote from the body, of the arresting hook so that locking can be implemented perpendicularly to the plane of mounted panels, the arresting hook has arranged nearer to the body a horizontal locking surface at its arresting step, the receiving hook has arranged remote from the body a horizontal locking surface in the receiving recess, formed at the receiving hook is a receiving opening through which the arresting step can be inserted substantially in the joining direction into the receiving recess, wherein the arresting step and the receiving opening are of such a configuration that the step end during a joining movement initially fits without elastic deformation of the hook profiles into the receiving opening, to such an extent that the horizontal locking surface of the arresting hook makes contact with a part of its surface with the horizontal locking surface of the receiving hook.

A2 The underside of the receiving hook can be disposed in a plane identical to the plane of the underside of the panel.

A3 The arresting contour and the positively locking contour desirably form an upper latching means, wherein the arresting contour has a female or a male latching element and wherein the positively locking contour has a female latching element or male latching element complementary to the arresting contour.

A4 It is further advantageous if the hook edge of the receiving hook and the arresting recess of the arresting hook form a lower latching means, wherein provided remote from the body at the hook edge of the receiving hook is a female latching element or a male latching element, and wherein the arresting recess has near the body a female latching element or a male latching element complementary thereto.

A5 Each female latching element has a latching surface directed towards the top side or the underside of the panel. This means that the surface normal of the latching surface is directed towards the corresponding side of the panel. In addition each male latching element has a latching surface directed towards the respective other side of the panel. In that respect it is provided that the latching surface of the female latching element together with the latching surface of the male latching element in the locked condition of two panels counteracts a movement of locked panels away from each other perpendicularly to the panel plane.

A6 Preferably the latching surface of the female latching element is in contact with the latching surface of the male latching element in the locked condition of two panels. In that way the lower latching means contributes to a firm locking action perpendicularly to the plane of assembled panels.

A7 Alternatively a gap can be provided between the latching surface of the female latching element and the latching surface of the associated male latching element in the locked condition of two panels. That can simplify the assembly procedure if for example a relative displacement between the transverse edges is to be implemented. A gap of a few tenths of a millimeter appears sufficient, preferably about 0.1 mm.

A8 The panels are desirably so designed that, during the joining movement, firstly the upper latching means and then the lower latching means are completely assembled.

A9 The arresting hook and/or the receiving hook can have a flexural region. The flexural region is desirably such that the width of the receiving opening can be increased by its elastic bendability so that the arresting step can be entirely inserted into the receiving recess and in addition the arresting contour of the arresting hook fits into the positively locking contour of the receiving hook. Admittedly the arresting contour and the positively locking contour are also pressed and deformed, but the harder and more brittle that the material of the body is, the correspondingly less is the elastic deformation of the arresting contour and the positively locking contour and correspondingly higher is the amount of elastic deformation of the flexural region. That design configuration now makes it possible to provide a high degree of undercut configuration for the positively locking connection between the arresting contour and the positively locking contour, even when the body is formed from a relatively hard and brittle material.

A10 The flexural region is in the form of a flexural leg for simplicity. It can be provided in the region of the hook element, that projects from the transverse edge of the panel.

A11 The horizontal locking surfaces of the hook profiles can be inclined through an angle of 0° to 45° relative to the surface normal of the top side. The angle of inclination substantially depends on the configuration of the arresting contour and the positively locking contour, in particular where the female or male latching element is arranged. An angle of inclination of between 7° and 25° has proven to be desirable. As a tendency, a lesser inclination can be provided if the arresting contour is provided with the female latching element and the positively locking contour has the male latching element adapted thereto. The smaller the angle of inclination, the correspondingly higher is the holding force to prevent the panels from being pulled apart in the plane of the assembled panels and perpendicularly to the transverse edges in question. Therefore angles of inclination <7° are preferred and an angle of inclination of about 3° is particularly advantageous. Basically a negative angle of inclination of the two horizontal locking surface is also possible. In that way, they would achieve a locking action perpendicularly to the plane of the panels. Upon an interchange of female and male latching elements, a larger angle of inclination is generally desirable so that the arresting contour can be connected together with the positively locking contour.

A12 It is helpful if the hook edge has an inclined sliding surface remote from the body. This involves a surface which is inclined with respect to the plane of the panel and which simplifies insertion of the hook edge into the arresting recess of the arresting hook.

A13 On its side remote from the body the arresting step can have an inclined sliding surface. The inclined sliding surface is a surface which is inclined with respect to the plane of the panel and which simplifies insertion of the arresting step into the receiving recess of the receiving hook. The inclined sliding surface is desirably of such a configuration that it cooperates with the positively locking contour. If the inclined sliding surface comes into contact with the positively locking contour the latter slides along the inclined sliding surface. As a result the receiving hook and the arresting hook can be moved away from each other parallel to the plane of the panel. At the same time the horizontal locking surface of the arresting hook can exert a force which presses against the horizontal locking surface of the receiving hook. That force which is applied to the horizontal locking surface of the receiving hook is transmitted to the receiving hook which can thereby elastically deform. In the further joining movement the arresting hook passes the positively locking contour until both have reached a position in which they fit into each other in positively locking relationship. It is thus possible to achieve a closed join. The horizontal locking surfaces of the two hook profiles are then preferably caused to bear snugly against each other.

A14 It is advantageous if there are provided a pair of pivotal profile portions, namely a groove profile portion with undercut configuration of a groove wall and a tongue profile portion with undercut configuration of a tongue side.

That has the advantage that panels can desirably be assembled in such a way that a new panel is fitted with a pivotal profile portion to the complementary profile portion of a panel which has already been fitted in place and is pivoted into the plane thereof.

In that respect it can also be advantageous at the same time for the hook profile of the new panel to be locked to the hook profile of a panel in the same row. For that purpose the arresting hook of the new panel is moved downwardly in a scissor-like movement substantially in a vertical plane and introduced into the receiving hook. During the scissor-like movement the arresting step initially projects into the receiving opening only at one end of the panel edge. When the scissor-like joining movement continues the arresting step moves stepwise into the receiving opening. When the panels are finally disposed in one plane the arresting contour and the positively locking contour are exactly fitted into each other; the transverse joining surfaces are in contact with each other and form a closed join.

A15 A decorative layer can be provided at the top side.

A16 It is also possible for a transparent cover layer to be provided at the top side, through which the body or the decorative layer is visible. The transparent cover layer serves to protect the layer therebeneath. It can be provided with means which reduce wear, for example corundum particles, glass particles, etc.

A17 A backing layer can be provided at its underside. That acts as a balance in relation to the layers provided at the top side to counteract distortion of the panel.

A18 The body can at least partially comprise a wood material, for example HDF, MDF, chipboard, OSB board, etc.

A19 If the body at least partially comprises a plastic material that can be a soft and elastic plastic material like a thermoplastic polymer, for example polyolefin, polypropylene, polyurethane or polyamide. So-called soft-PVC can also be provided as the soft plastic material. This involves a polyvinylchloride which contains plasticiser. Basically however PVC is an amorphous elastomer which has a natural hardness and brittleness which can only be reduced by the plasticisers. This can also involve a plastic material with natural hardness and brittleness, for example an amorphous elastomer like PVC which contains no plasticiser at all or only a small amount of plasticiser.

In addition there is proposed a panel comprising a body with at least one plastic layer, complementary locking means provided in pairs at mutually opposite panel edges, at least one pair of locking means with hook profiles, namely a receiving hook and in opposite relationship thereto an arresting hook, with the proviso that the receiving hook has remote from the body a hook edge and arranged nearer to the body a receiving recess, wherein the receiving recess is open towards the top side, the arresting hook is provided with an arresting recess arranged nearer to the body and open to the underside and has an arresting step which is arranged remote from the body and which fits in a vertical joining direction into the receiving recess of the receiving hook, the arresting hook has a joining surface remote from the body and also remote from the body a vertically acting arresting contour, the receiving hook has a joining surface nearer to the body and also nearer to the body a positively locking contour which fits together in positively locking relationship with the arresting contour, that is remote from the body, of the arresting hook so that vertical locking can be implemented, the arresting hook has arranged nearer to the body a horizontal locking surface at its arresting step, the receiving hook arranged remote from the body has a horizontal locking surface in the receiving recess, formed at the receiving hook is a narrowed receiving opening through which the arresting step can be inserted substantially in the vertical joining direction into the receiving recess, and the free step end of the arresting step is narrower than the width of the receiving opening of the receiving hook, wherein the arresting contour, that is remote from the body, of the arresting hook is set back behind the plane of the joining surface of the arresting hook, the positively locking contour, that is nearer to the body, of the receiving hook projects at least partially beyond the plane of the joining surface of the receiving hook, the arresting step and the receiving opening are of such a configuration that the step end during a joining movement initially fits without elastic deformation of the hook profile into the receiving opening to such an extent that the horizontal locking surface of the arresting hook makes contact with a part of its surface with the horizontal locking surface of the receiving hook and the receiving hook has a flexural leg so adapted that the width of the receiving opening can be enlarged by its elastic bendability so that the arresting step can be entirely inserted into the receiving recess and also the arresting contour of the arresting hook is inserted into the positively locking contour of the receiving hook.

A20 A method of simultaneously locking a new quadrangular panel provided with two longitudinal edges and two transverse edges to a previous panel row already assembled from identical panels and to an identical panel already assembled in the same panel row with the proviso that a first longitudinal edge is connected to the previous panel row in positively locking relationship by pivoting the new panel into the plane of the assembled panels, wherein at the same time a first transverse edge of the new panel is brought by a scissor-like movement into positively locking engagement with a second transverse edge of the assembled panel in the same panel row, with the further proviso that the first transverse edge of the panels respectively has a first transverse joining surface and the second transverse edge of the panels respectively has a second transverse joining surface, wherein the first transverse joining surface is brought into contact at that end which is towards the first longitudinal edge with the second transverse joining surface of the assembled panel in the same panel row, wherein the positively locking connection of the longitudinal edge and the transverse edge of the new panel is produced by a longitudinal join gap and a transverse join gap being produced between the new panel and the previous panel row, the wedge tip of the transverse join gap points in the direction of the previous panel row and the wedge tip of the longitudinal join gap points in the direction of the free second transverse edge of the new panel, and the new panel is finally pivoted into the plane of the assembled panels, wherein the positively locking engagement of the transverse edges and longitudinal edges is completely brought together and the wedge-shaped join gaps are removed. The transverse edges are a little shifted/displaced in their longitudinal direction by the transverse join gap. The displacement corresponds to the gap dimension at the widest location of the transverse join gap. To eliminate the displacement the transverse edges must be movable/displaceable relative to each other. It is then desirable if at least one latching means, for example the lower latching means, is of such a configuration that between latching surfaces there is a small gap, for example 0.1 mm, to facilitate mobility of the transverse edges.

A21 The longitudinal join gap can be produced by the new panel being temporarily brought out of its parallel orientation with the previous panel row and the wedge tip of the longitudinal join gap being produced at the remote end of the first longitudinal edge of the new panel.

A22 On the other hand the longitudinal join gap can be produced by the new panel being temporarily brought out of its flat form by being curved out of its plane in the direction of its top side.

Figure 2A:
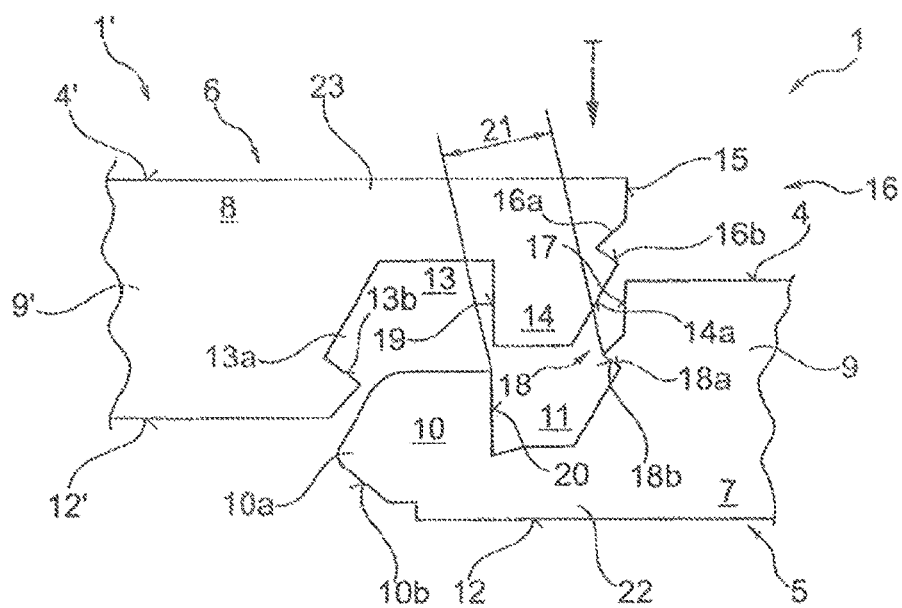
Figure 2B:
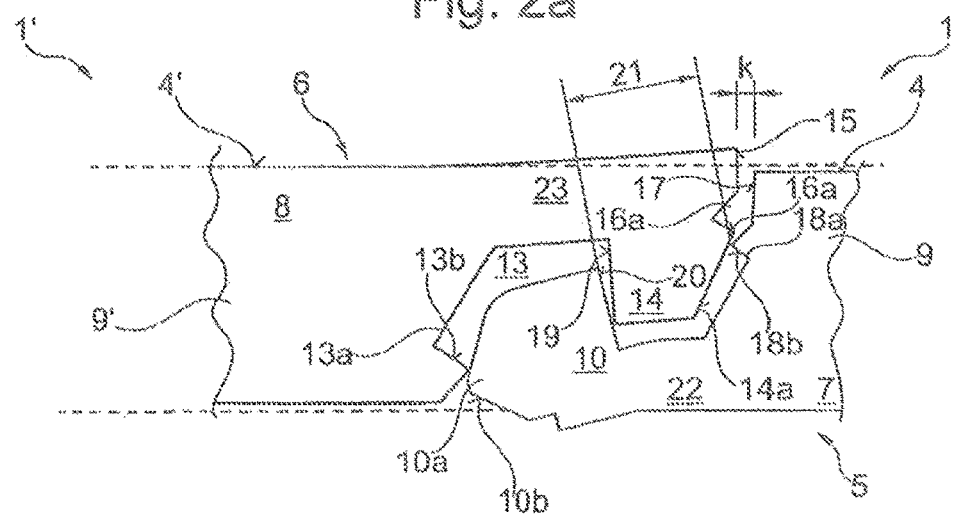
Figure 2C:
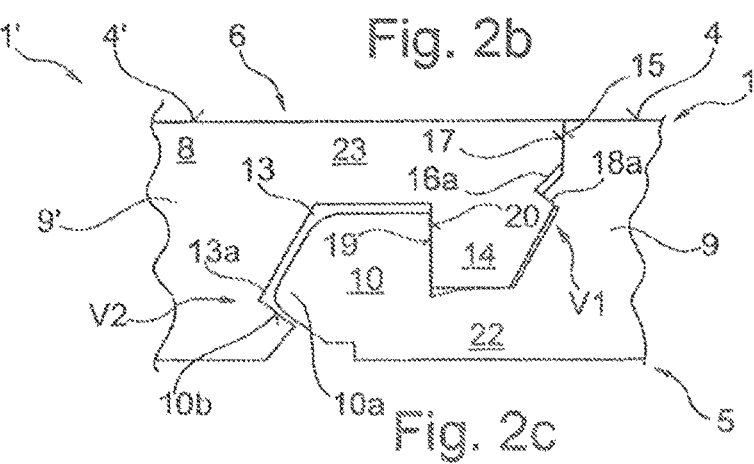
Figure 3A:
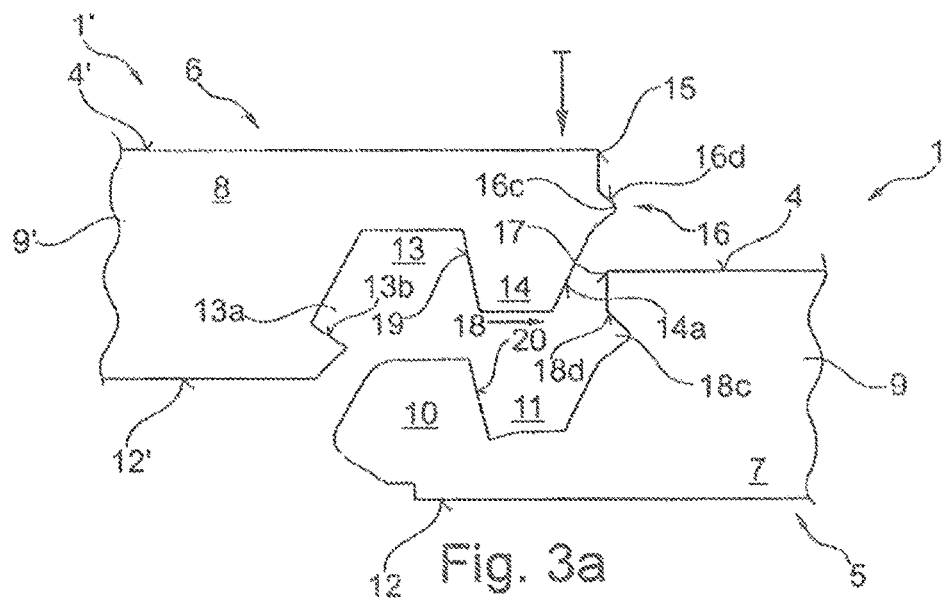
Figure 3B:
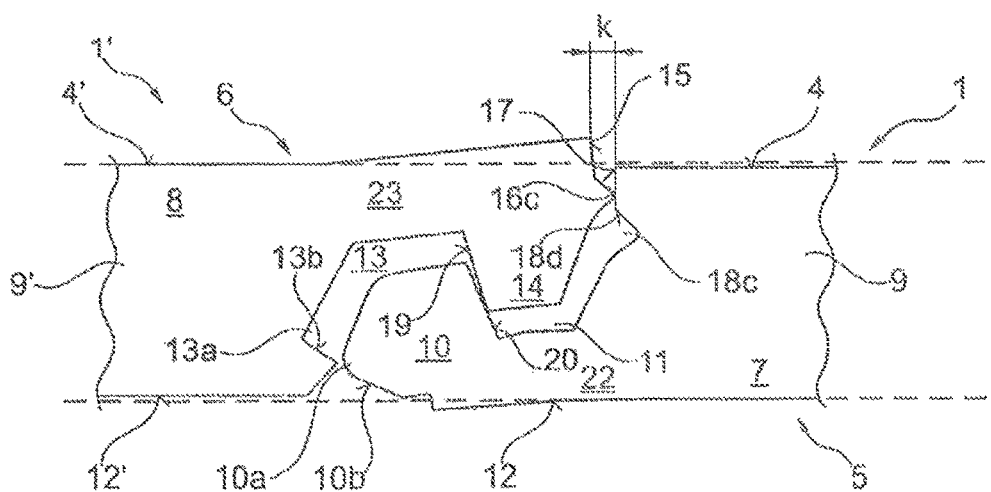
Figure 3C:
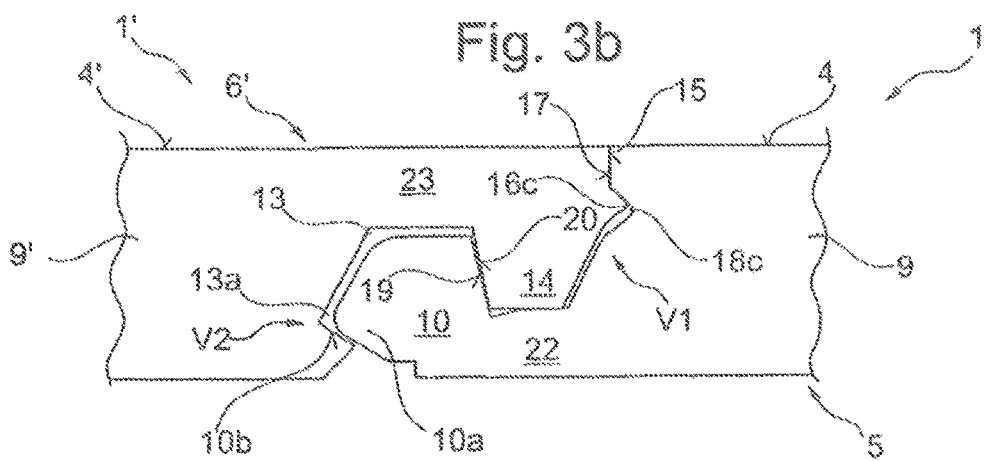
Figure 4A:
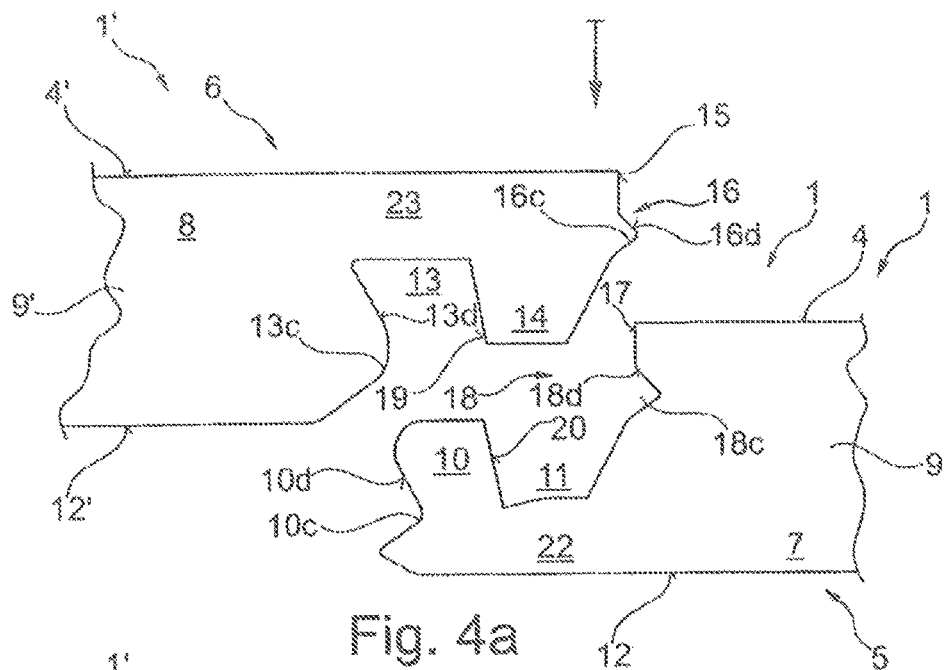
Figure 4B:
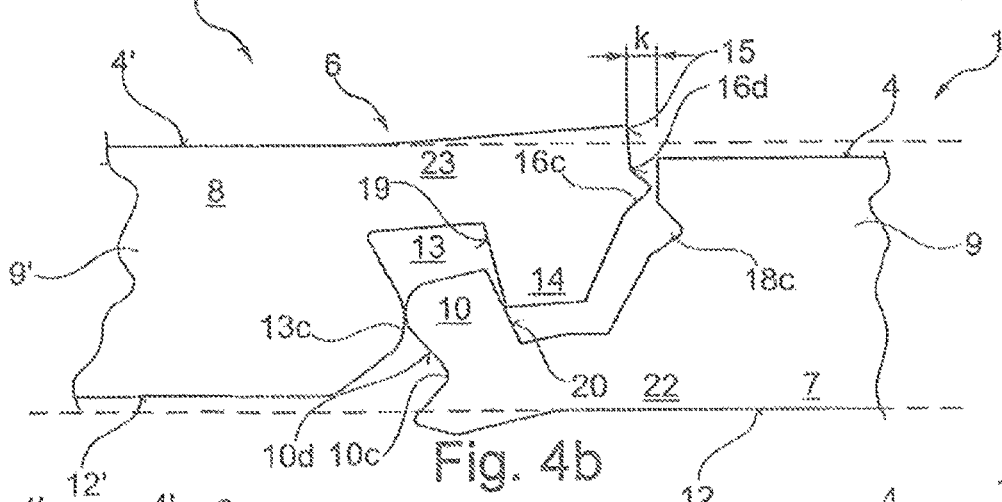
Figure 4C:
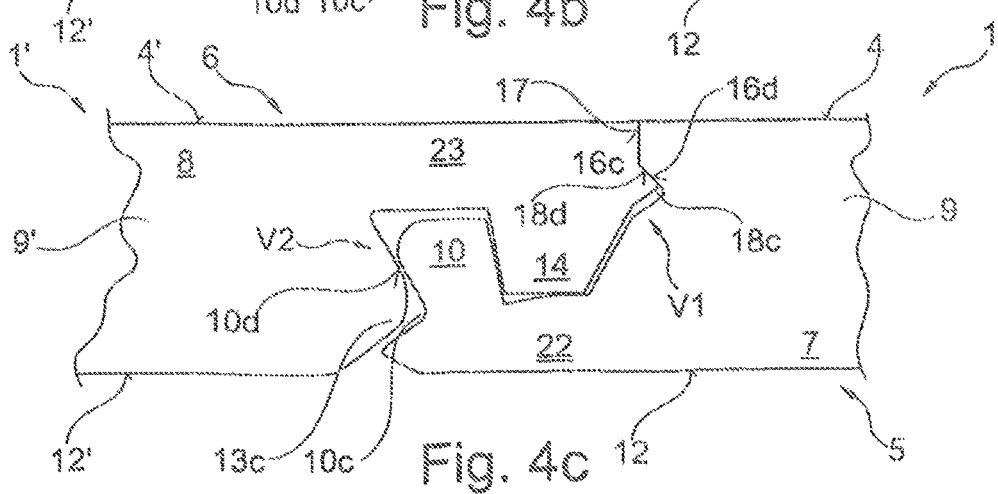
Figure 5A:
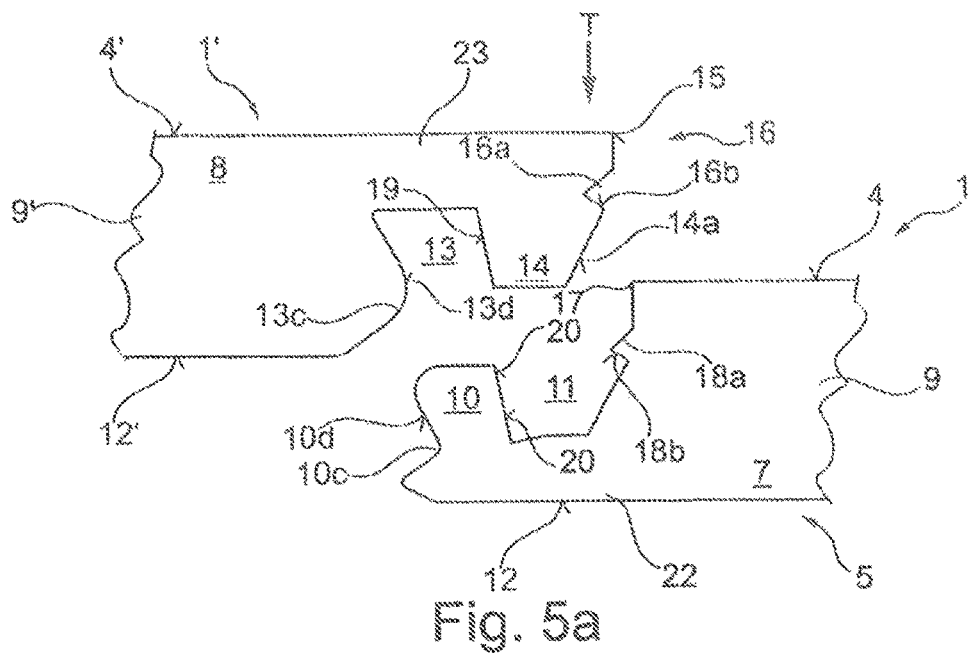
Figure 5B:
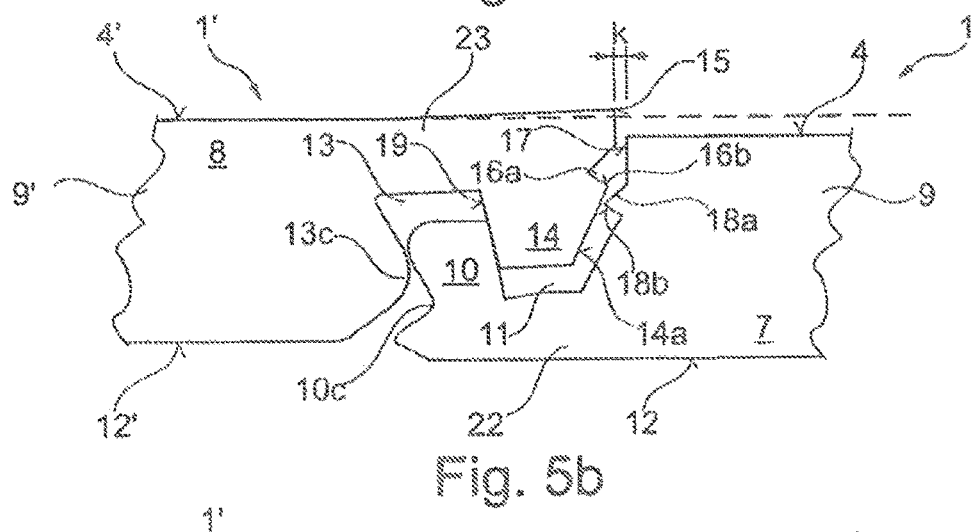
Figure 5C:
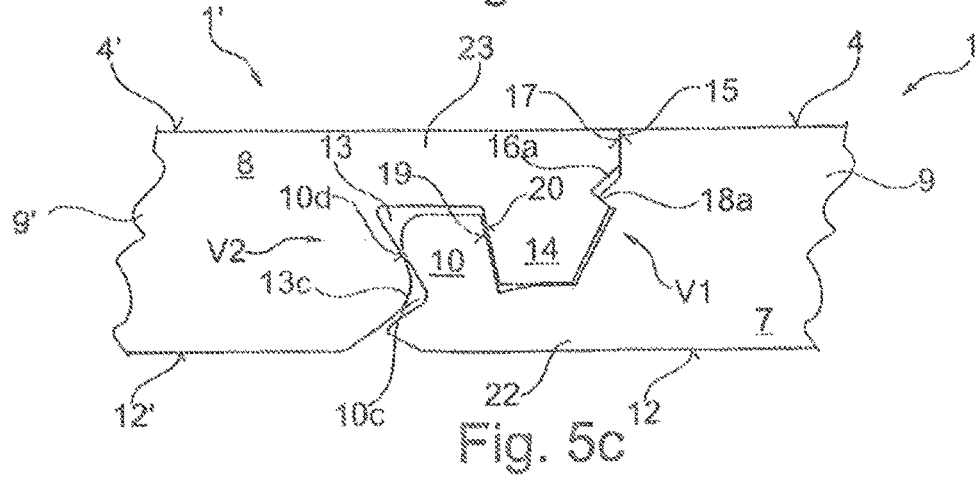
Figure 6A:
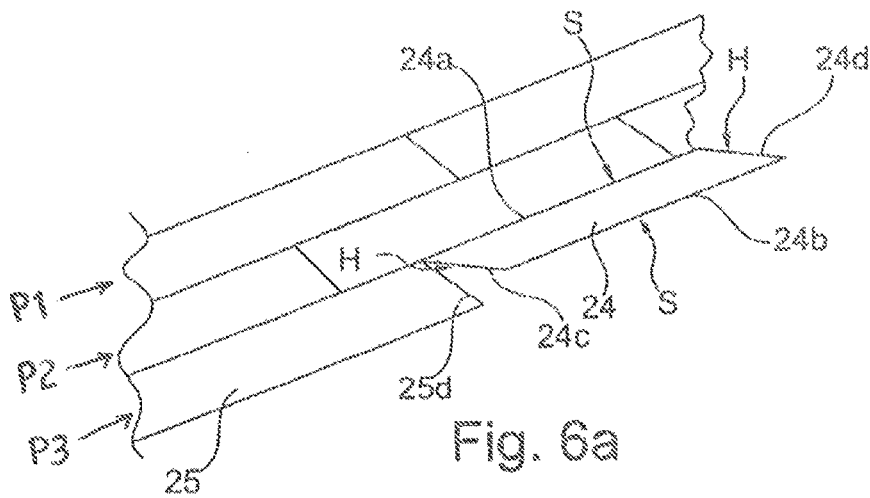
Figure 6B:
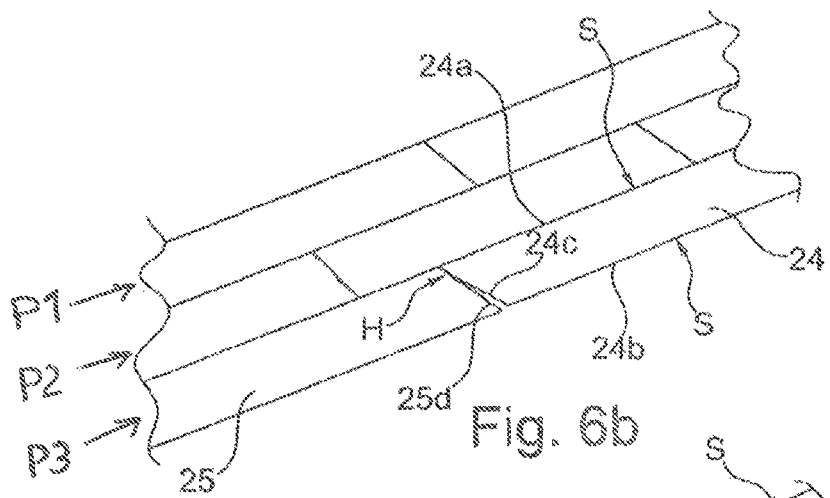
Figure 6C:
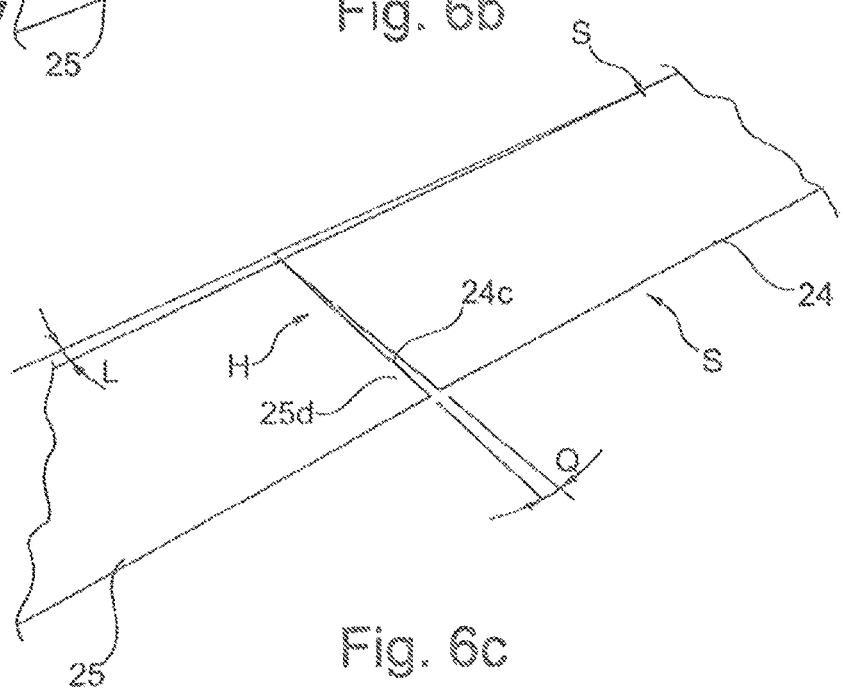

The invention is illustrated by way of example hereinafter in a drawing and described in detail by means of a number of embodiments. In the drawing:

FIG. 1 shows an embodiment of a first pair of edges (longitudinal edges) with pivotal profile portions, FIGS. 2a-2c show complementary locking means of a second pair of edges (transverse edges) and the stepwise joining movement thereof, FIGS. 3a-3c show a first alternative embodiment of complementary locking means of a second pair of edges (transverse edges) and the stepwise joining movement thereof, FIGS. 4a-4c show a second alternative embodiment of complementary locking means of a second pair of edges (transverse edges) and the stepwise joining movement thereof, FIGS. 5a-5c show a third alternative embodiment of complementary locking means of a second pair of edges (transverse edges) and the stepwise joining movement thereof, and FIGS. 6a-6c show diagrammatic views of a locking method for assembling panels according to the invention.

FIG. 1 shows a first pair of edges of a panel 1 and 1' respectively according to the invention, namely a pair of longitudinal edges. The pair of longitudinal edges has complementary pivotal profile portions S. It is possible to use as such all positively locking profile portions which are known in the state of the art and which can be connected in positively locking relationship by inclinedly attaching a new panel to a previous row of panels and then pivoting a new panel 1' into the plane of the assembled panels.

The complementary pivotal portions S in FIG. 1 include a groove profile portion 2 and a tongue profile portion 3. The groove profile portion 2 has an upper groove wall 2a which is shorter than the lower groove wall 2b. The lower groove wall is also provided with a recess 2c of undercut configuration, for the tongue profile portion 3. The recess 2c also has a horizontal locking surface 2d. The tongue profile portion 3 is provided with a tongue top side 3a and a tongue underside 3b which is arranged substantially parallel to the top side 4 of the new panel 1'. The tongue underside has an undercut configuration 3c and a horizontal locking surface 3d cooperating with the horizontal locking surface 2d of the lower groove wall 2b. The inclined position of the new panel 1' is shown in FIG. 1 by the position illustrated in broken line of the tongue profile portion 3'. The tongue underside is placed on the longer lower groove wall 2b. The new panel 1' is moved with the tip of the tongue leading into the groove profile portion 2 and the new panel 1' is then pivoted into the plane of the assembled panel or panels.

FIGS. 2a to 2c each show a portion of a second pair of edges, namely transverse edges of a panel 1 and 1' respectively. The panels 1 and 1' are identical. Each individual panel, at mutually opposite transverse edges of a pair of edges, has complementary profile portions 5 and 6 respectively. In the case of the panel 1 therefore the edge (not shown) identically has the profile portion 5 of the panel 1' and in the case of the panel 1' the edge (not shown) identically has the profile portion 6 of the panel 1.

Embodiments of quadrangular panels are also possible, whose first pair of edges (pair of longitudinal edges) is formed with complementary profile portions identical to the profile portions of the second pair of edges (pair of transverse edges). Further examples of pairs of transverse edges are described hereinafter.

The series in FIGS. 2a to 2c shows in a number of steps the procedure in principle of the joining movement for the purposes of connecting and locking the panels 1 and 1'.

The complementary profile portions 5 and 6 of each panel 1 and 1' respectively form complementary locking means in the form of hook profiles H. The hook profile of the panel 1 forms a receiving hook 7 and the hook profile of the profile portion 1' forms an arresting hook 8 which fits into the receiving hook, wherein the two hook profiles are of such a configuration that an arresting action is effected, which counteracts a reversal of the joining movement. Thus after locking has been effected the panels 1 and 1' cannot be released from each other again perpendicularly to the plane of assembled panels.

Each panel 1 and 1' includes a body 9 and 9' respectively, on which the above-mentioned complementary locking means are arranged. The top side 4 of the panels forms a working surface.

Provided on the receiving hook 7 remote from the body is a hook edge 10 while closer to the body is a receiving recess 11. The receiving recess 11 is open to the top side 4.

The arresting hook 8 is provided with an arresting recess 13 which is arranged closer to the body and which is open to the underside 12' and remote from the body has an arresting step 14. The arresting step fits into the receiving recess 11 of the receiving hook, in the perpendicular joining direction T. In addition the arresting hook 8 has a transverse joining surface 15 remote from the body and also remote from the body an arresting contour 16 which has a vertically locking action. Near the body the receiving hook 7 has a transverse joining surface 17 and also near the body a positively locking contour 18 which fits together in positively locking relationship with the arresting contour 16 of the arresting hook 8. Formed in that way is an upper latching means V1 with which locking can be implemented perpendicularly to the plane of the panel.

The arresting hook 8 also has arranged near the body a horizontal locking surface 19 arranged on its arresting step 14. In matching relationship therewith the receiving hook 7, arranged remote from the body in the receiving recess 11, has a horizontal locking surface 20 cooperating with the horizontal locking surface 19 of the arresting hook 8.

At its receiving recess 11 the receiving hook 7 is provided with a narrowed receiving opening 21. The arresting step 14 can be introduced into the receiving recess 11 substantially in a vertical joining direction T, that is to say in a plane perpendicular to the plane of the locked panels.

Referring to FIGS. 2a to 2c the panel 1 is arranged with the receiving hook 7 on a fixed substrate (not shown). The arresting step 14 of the panel 1' is lowered perpendicularly to the plane of the panel (vertically). The arresting contour 16, that is remote from the body, of the arresting hook 8 has a female latching element 16a (recess). The female latching element 16a has a latching surface 16b directed towards the top side 4' of the panel 1' and which is set back behind the plane of the transverse joining surface 15 of the arresting hook 8. The positively locking contour 18, that is near the body, of the receiving hook 7 is of such a configuration that it has a male latching element 18a having a latching surface 18b which is directed towards the underside 12 of the panel 1 and which projects beyond the plane of the transverse joining surface 17 of the receiving hook 7 and which in the locked condition engages behind the female latching element 16a of the arresting hook 8. In addition the arresting step 14 and the receiving opening 21 are of such a configuration that the free end of the arresting step 14, during the beginning of the joining movement, firstly fits into the receiving opening 21 without any elastic deformation worth mentioning of the hook profiles. In that situation the horizontal locking surface 19 of the arresting hook 8, with a part of its surface, comes into contact with the horizontal locking surface 20 of the receiving hook 7.

Provided on the receiving hook 7 is a flexural leg 22 which can best be seen from FIG. 2b. The flexural leg 22 is of such a configuration that the width of the receiving opening 21 can be enlarged by its elastic bendability so that the arresting step 14 can be inserted into the receiving recess 11 without any problem. In addition, because of the bendability of the flexural leg 22, the arresting contour 16 of the arresting hook 8 can be very easily introduced into the positively locking contour 18 of the receiving hook 7.

The hook profiles are to be brought into engagement at the beginning of the joining movement without already being elastically deformed at the engagement location. It is only upon further progress with the joining movement that the undercut regions, namely the female latching element 16a of the arresting contour and the male element 18a of the positively locking contour, come into contact at the engagement location. That contact however causes elastic deformation which takes place substantially at another location, namely at the flexural leg 22 provided for that purpose. Admittedly the arresting contour 16 and the positively locking contour 18 are also pressed and deformed, but the harder and more brittle that the material of the body 9/9' is, the correspondingly less is the elastic deformation of the arresting contour 16 and the positively locking contour 18 and the correspondingly greater is the degree of elastic deformation of the flexural leg 22.

The female latching element 16a of the arresting hook 8 can be deeper and the male latching element 18a of the receiving hook 7 can project further from the transverse joining surface 17 of the receiving hook 7, than in the case of the panel without a flexural leg 22. The increased degree of undercut configuration improves the resistance to assembled panels being moved away from each other perpendicularly to the panel plane. In spite of the increased resistance the arresting contour 16 and the positively locking contour 18 can be brought into engagement without any problem because the flexural leg 22 permits an enlargement of the receiving opening 21. The arresting contour 16 and the positively locking contour 18 can thus be moved past each other without severe inherent deformation until they are in positively locking engagement and deploy their locking action.

FIG. 2b shows that an inclined surface is provided remote from the body at the arresting step 14, which forms an inclined sliding surface 14a. The inclined sliding surface contacts the male latching element 18a of the positively locking contour 18 of the receiving hook 7. During the scissor-like joining movement of the arresting hook 8 a horizontal movement is thereby superimposed, which moves the panels 1/1' away from each other so that a spacing is formed between the transverse joining surfaces 15/17. At the same time the horizontal locking surface 19 of the arresting hook 8 exerts a force which presses against the horizontal locking surface 20 of the receiving hook 7. The force acting on the horizontal locking surface 20 of the receiving hook is transmitted to the flexural leg 22 of the receiving hook, which is thereby elastically flexed.

In addition FIG. 2b shows that at its hook edge 10 the receiving hook 7 has a male latching element 10a and the arresting recess 13 is provided with a female latching element 13a which cooperates with the male latching element 10a and which in the assembled condition of the panels also counteracts movement of assembled panels away from each other perpendicularly to the panel plane. That configuration forms a lower latching means V2 which supports the upper latching means V1. For that purpose the female latching element 13a has a latching surface 13b which is directed towards the top side 4' of the panel 1' while the male latching element 10a has a latching surface 10b which is directed towards the underside 12 of the panel 1 and cooperates with the female latching surface 13b.

The arresting hook 8 is so designed that in the joining process the arresting recess 13 of the arresting hook 8 is enlarged and that facilitates introduction of the hook edge 10 with the male latching element 10a into the arresting recess provided with the female latching element 13a. For that purpose a flexural leg 23 is provided on the arresting hook. When a force acts from the outside on the horizontal locking surface 19 of the arresting hook 8, as in FIG. 2b, by virtue of the horizontal locking surface 20 of the receiving hook 7, the flexural leg 23 is bent with that force, and that results in enlargement of the arresting recess 13 and facilitates assembly.

In the further joining movement the widest location of the arresting step 14 passes the enlarged receiving opening 21 of the receiving recess 11. The bending of the flexural leg 22 then decreases and the receiving opening 21 narrows again. The transverse joining surfaces 15/17 of the panels, which surfaces are at the spacing k, are pressed towards each other by the flexural stress of the flexural leg 22. At the same time the bending of the flexural leg 23 decreases and the hook edge 10 also passes in positively locking relationship into the arresting recess 13 and the panels are also pressed towards each other by the flexural stress of the flexural leg 23. The panels can be pressed towards each other in such a way that a closed transverse join is afforded.

In FIG. 2c the arresting contour 16 and the positively locking contour 18 have reached a position in which they fit into each other in positively locking relationship. The hook profiles H can be so designed that a remaining flexural stress of the flexural legs 22 and 23 is maintained and an elastic force (spring force) is exerted by way of the horizontal locking surface 20 of the receiving hook 7, which elastic force permanently biases the transverse joining surface 15 of the arresting hook 8 in the direction of the transverse joining surface 17 of the receiving hook 7. In that way a closed transverse join can be durably produced. In FIG. 2c the horizontal locking surface 19, 20 of the two hook profiles H bear snugly against each other and exert no permanent biasing.

The upper latching means V1 and the lower latching means V2 are so matched to each other that firstly the upper latching means passes into its positively locking position and then the lower latching means passes into its positively locking position. For that purpose the flexural properties (degrees of flexural stiffness) of the receiving hook 7 and the arresting hook 8 can be suitably matched to each other.

In particular implementation of the flexural stiffness of the receiving hook 7 requires particular care and thoroughness. If the receiving hook for example is bent into a soft substrate which deadens the sound of footsteps and which affords scarcely any backing in relation to the pressure force transmitted from the top side 4 of the panel, the elastic bending of the flexural leg 22 must generate an adequate return force to ensure the positively locking connection of the lower latching means V2.

FIGS. 3a-3c show a first alternative to the embodiment of FIGS. 2a-2c. The same references are used for identical technical features. The difference lies in a modified configuration of the upper latching means V1. More specifically the arresting contour 16 of the arresting hook is provided with a male latching element 16c. It has a latching surface 16d which is now directed towards the top side 4' of the panel 1'. Provided on the positively locking contour of the receiving hook 7 is a female element 18c which is matched thereto, having a latching surface 18d, now directed towards the underside 12 of the panel 1. At the beginning of the joining movement the transverse joining surface 15 of the arresting hook is at a larger spacing from the transverse joining surface 17 than in the embodiment of FIGS. 2a-2c. Because now the tip of the male latching element 16c bears against the transverse joining surface 17 the arresting step 14 is overall at a greater spacing from that transverse joining surface 17. So that the arresting step 14 nonetheless fits into the receiving recess 11 in such a way that the horizontal locking surfaces 19 and 20 can be brought partially into contact the horizontal locking surface 20 is inclined more greatly than in the embodiment of FIGS. 2a-2c. The inclinations of the horizontal locking surface 19/20 are matched to each other.

FIGS. 4a-4c show an embodiment in which the upper latching means V1 is identical to that in FIGS. 3a-3c. The upper latching means V1 involves the same function as described in the previous embodiment so that attention is directed to the description there. Provided in the region of the lower latching means V2 is a modified configuration. More specifically the hook edge 10 of the receiving hook 7 is provided with a female latching element 10c having a latching surface 10d. In this case that latching surface 10d is directed towards the underside 12 of the panel 1. Matching same the arresting recess 13 of the arresting hook 8 has a male latching element 13c. It is provided with a latching surface 13d directed towards the top side 4' of the panel 1'.

FIGS. 5a-5c show an embodiment whose upper latching means V1 has an arresting contour corresponding to FIGS. 2a-2c, but in this case the horizontal locking surface 19 involves a greater angle of inclination. The lower latching means V2 is identical to that in FIGS. 4a-4c. To be able to easily connect together that configuration of the lower latching means V2, the greater angle of inclination of the horizontal locking surface 19 is desirable. The angle of inclination of the horizontal locking surface 20 is adapted to the angle of inclination of the horizontal locking surface 19.

Fitting a new panel 24 involves performing a method which is provided for locking a new quadrangular panel having two longitudinal edges and two transverse edges to a previous panel row P2 which has already been assembled from identical panels and simultaneously for locking to an identical panel 25, which has already been fitted, in the same panel row P3.

FIG. 6a shows the production of an assembled surface consisting of panels according to the invention. The rows of panels P1-P3 are shown portion-wise. The new quadrangular panel 24 is only diagrammatically illustrated. The panels used involve an embodiment having a pair of longitudinal edges 24a/24b provided with complementary positively locking pivotal profile portions S and a pair of transverse edges 24c/24d having complementary hook profiles H. The pivotal profiles S serve to connect panels of different rows together. In this embodiment the hook profiles H serve to connect panels of the same row P3 together. The hook profiles H of the pair of transverse edges can be of the configuration as in one of the embodiments shown in FIGS. 2a to 5c.

FIG. 6a shows how a new panel 24 is fitted in the foremost row P3, which panel 24 is to be locked both to the previous row of panels P2 and also to a transverse edge 25d of an adjacent panel 25 in the same row P3. The new panel 24 is fitted to the front row P2 of panels inclinedly in relation to the plane of the assembled panels and with one of its pivotal profile portions S. Then it is locked to the previous row of panels P2 by pivotal movement into the plane of the assembled panels. At the same time in that case the hook profile provided at the transverse edge 24c (arresting hook 8) of the new panel 24 is also locked to the hook profile provided at the transverse edge 25d (receiving hook 7) of the panel 25 of the same row P3. While the new panel 24 is being pivoted into the plane of the assembled panels the arresting hook 8 is simultaneously brought into engagement with the receiving hook 7 in a scissor-like joining movement.

In that case the positively locking connection of the longitudinal edge 24a and the transverse edge 24c of the new panel 24 is produced by a longitudinal join gap L being formed between the new panel 24 and the previous row of panels P2 and a transverse join gap Q being formed between the transverse edge 25d of the panel 25 and the transverse edge 24c of the new panel 24. The wedge tip of the transverse join gap Q points in the direction of the previous row of panels P2 and the wedge tip of the longitudinal join gap L points in the direction of the free second transverse edge 24d of the new panel 24. When finally the new panel 24 is pivoted into the plane of the assembled panels the positively locking engagement of the transverse edges 24c/25d and the longitudinal edge 24a with the previous row of panels P2 is completely produced in the assembled condition and the wedge-shaped join gaps Q and L are eliminated.

The longitudinal join gap L is produced by the new panel 24 being temporarily moved out of its parallel orientation with respect to the previous row of panels P2 and by the wedge tip of the longitudinal join gap L being produced at the remote end of the first longitudinal edge 24a of the new panel 24.

LIST OF REFERENCES 1 panel
1' panel
2 groove profile
2a upper groove wall
2b lower groove wall
2c recess
2d horizontal locking surface
3 tongue profile
3a tongue top side
3b tongue underside
3c undercut configuration
3d horizontal locking surface
4 top side
4' top side
5 profile
6 profile
7 receiving hook
8 arresting hook
9 body
9' body
10 hook edge
10a male latching element
10b latching surface
10c female latching element
11 receiving recess
12 underside
12' underside
13 arresting recess
13a female latching element
13b latching surface
14 arresting step
14a inclined sliding surface
15 transverse joining surface (arresting hook)
16 arresting contour
16a female latching element
16b latching surface
16c male latching element
16d latching surface
17 transverse joining surface (receiving hook)
18 positively locking contour
18a male latching element
18b latching surface
18c female latching element
18d latching surface
19 horizontal locking surface (arresting hook)
20 horizontal locking surface (receiving hook)
21 receiving opening
22 flexural leg (receiving hook)
23 flexural leg (arresting hook)
24 new panel
24a longitudinal edge
24b longitudinal edge
24c transverse edge
24d transverse edge
25 panel
25d transverse edge
H hook profile
L longitudinal join gap
Q transverse join gap
S pivotal profile portion
T joining direction
V1 upper latching means
V2 lower latching means

The invention claimed is:

1. A method of simultaneously locking a new quadrangular panel provided with two longitudinal edges and two transverse edges to a previous panel row already assembled from identical panels and to an identical panel already assembled in the same panel row with the proviso that a first longitudinal edge is connected to the previous panel row in positively locking relationship by pivoting the new panel into the plane of the assembled panels, wherein at the same time a first transverse edge of the new panel is brought by a scissor-like movement into positively locking engagement with a second transverse edge of the assembled panel in the same panel row, with the further proviso that the first transverse edge of the panels respectively has a first transverse joining surface and the second transverse edge of the panels respectively has a second transverse joining surface, wherein the first transverse joining surface is brought into contact at that end which is towards the first longitudinal edge with the second transverse joining surface of the assembled panel in the same panel row, wherein the positively locking connection of the longitudinal edge and the transverse edge of the new panel is produced by a wedge-shaped longitudinal join gap and a wedge-shaped transverse join gap being produced between the new panel and the previous panel row, a wedge tip of the wedge-shaped transverse join gap points in the direction of the previous panel row and a wedge tip of the wedge-shaped longitudinal join gap points in the direction of the free second transverse edge of the new panel, and the new panel is finally pivoted into the plane of the assembled panels, wherein the positively locking engagement of the transverse edges and longitudinal edges is completely brought together and the wedge-shaped join gaps are removed.

2. The method according to claim 1 wherein the wedge-shaped longitudinal join gap is produced by the new panel being temporarily brought out of its parallel orientation with the previous panel row and the wedge tip of the wedge-shaped longitudinal join gap being produced at the remote end of the first longitudinal edge of the new panel.

3. The method according to claim 1 wherein the wedge-shaped longitudinal join gap is produced by the new panel being temporarily brought out of its flat form by being curved out of its plane in the direction of its top side.

* * * * *